Oct. 31, 1961  V. B. McCARTER  3,006,073
DENTAL APPLIANCE
Filed June 25, 1958  2 Sheets-Sheet 1

INVENTOR
*Van B. McCarter*

BY *Mason, Fenwick & Lawrence*
ATTORNEYS

Oct. 31, 1961   V. B. McCARTER   3,006,073
DENTAL APPLIANCE
Filed June 25, 1958   2 Sheets-Sheet 2
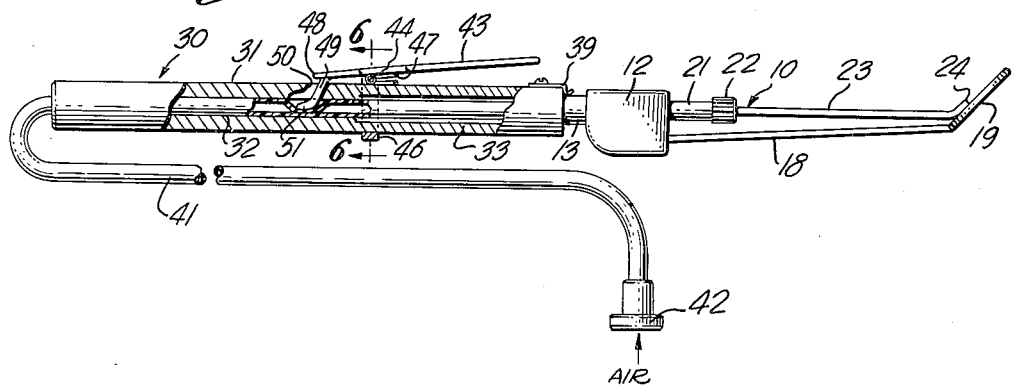
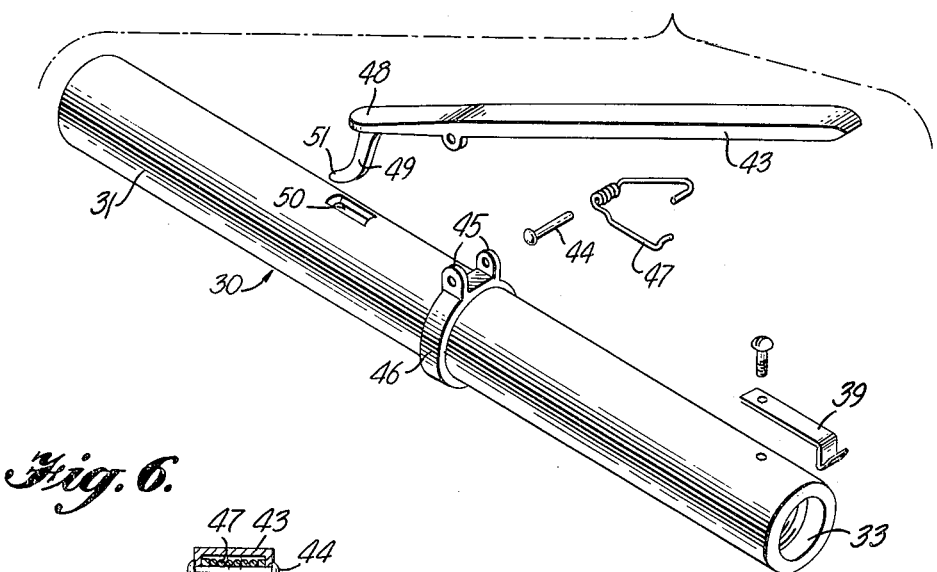
INVENTOR
Van B. McCarter
BY Mason, Fenwick & Lawrence
ATTORNEYS United States Patent Office 3,006,073
Patented Oct. 31, 1961

3,006,073
DENTAL APPLIANCE
Van B. McCarter, Cox Bldg., Jefferson St., Galax, Va.
Filed June 25, 1958, Ser. No. 744,386
5 Claims. (Cl. 32—69)

The present invention relates in general to dental implements and more particularly to dental mirror units designed for use with high speed dental drilling equipment.

This application is a continuation-in-part of my copending application Serial No. 678,701 filled August 16, 1957, and entitled Dental Appliance, now abandoned.

Prior to approximately five years ago, dental drilling was uniformly performed with drilling equipment operating at speeds ranging downwardly from 3,000 revolutions per minute. In the course of extensive experimentation looking toward the development of improved techniques, it was discovered that increasing the drill speed progressively increased the ease with which the drill cut tooth structure. This led to the development of high speed dental drills, of which the currently used diamond stone drills are an example, which rotate at speeds ranging from 60,000 to 150,000 r.p.m. Some experimental drills are now undergoing tests which revolve at speeds in excess of 200,000 r.p.m. It is estimated that the next five years will see a dramatic conversion of dentists to some form of high speed drill.

These increases in drill speed, however, have produced a need for greater quantities of water to cool the drill, as it has been found that drills which revolve at speeds of over 10,000 r.p.m. create excessive heat and kill or severely damage the nerve in the tooth. The diamond stone drills operating at speeds from 60,000 to 150,000 r.p.m. require 25 to 50 centimeters of water per minute to adequately cool the stone and tooth, and one writer has recently advocated spraying 50 to 60 cc. per minute directly on the drill burr when the drill speed exceeds 100,000 r.p.m. These quantities of water are too great for the conventional saliva ejector to adequately remove it from the mouth. Advances have been made to remove this water from the mouth by increased vacuum produced by motor driven vacuum equipment.

However, no satisfactory solution has heretofore been found to the problem of removing water in such large quantities from the surface of the dental mirror to afford clear observation when the dental mirror must be substituted for direct vision as in working on the upper teeth. To relieve this problem accompanying the use of high speed drills, some dentists advocate dispensing entirely with the dental mirror and laying the patient back to a reclining position so that direct vision may be employed in working on the upper teeth. This is an impractical solution which the patient will not long tolerate.

An object of the present invention, therefore, is the provision of novel means for effectively preserving a clear image of a dental field in a dental mirror during high speed drilling under water coolant.

Another object of the present invention is the provision of novel means in conjunction with dental mirrors for keeping running, spattering water such as would distort vision off of the mirror surface during high speed drilling with water coolant.

Other objects, advantages and capabilities of the present invention will become apparent from the following detail description, taken in conjunction with the accompanying drawings illustrating a preferred embodiment of the invention.

FIGURE 4 is a side elevation, with parts broken away, of the dental mirror assembled with a valved handle embodying the present invention;

FIGURE 5 is an exploded perspective view of the valve handle; and

FIGURE 6 is a transverse section view taken along the line 6—6 of FIGURE 4.

Figure 1:
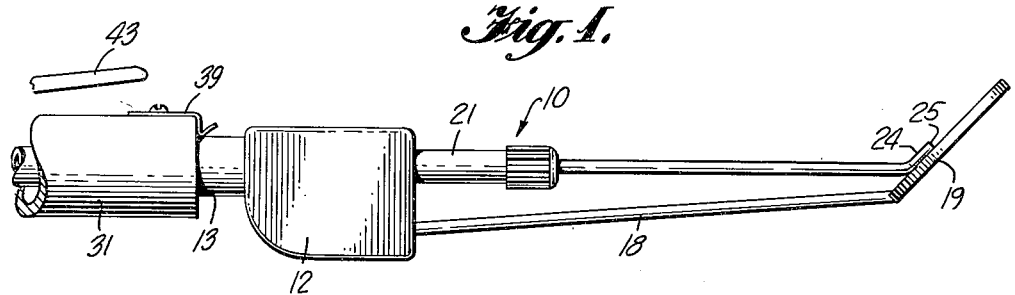
FIGURE 1 is a side elevation of a dental mirror constructed in accordance with an embodiment of the present invention.
Figure 2:
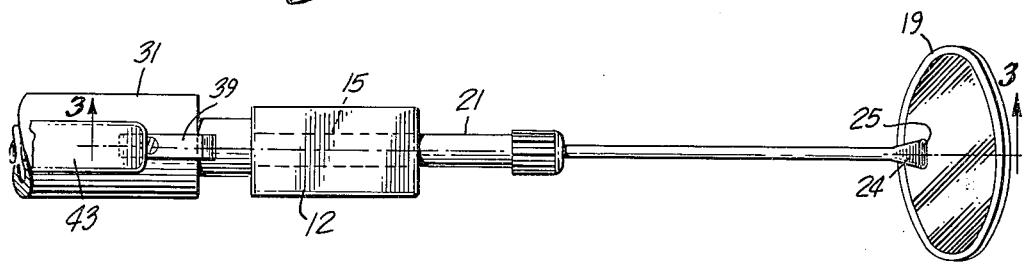
FIGURE 2 is a top plan view of the dental mirror.
Figure 3:
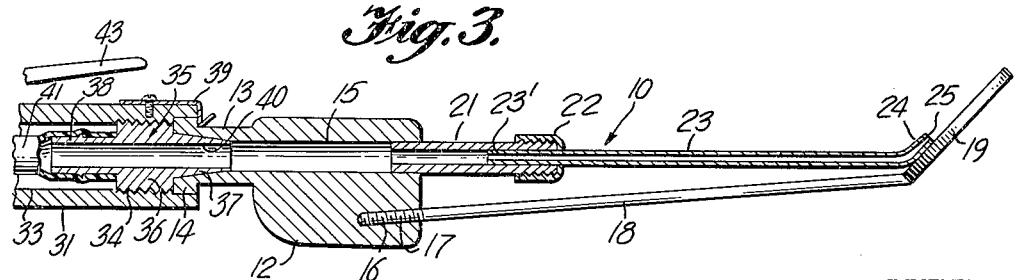
FIGURE 3 is a vertical longitudinal section taken along the line 3—3 of FIGURE 2.

Referring to the drawings wherein like reference characters designate corresponding parts throughout the several figures, the dental mirror attachment of the present invention, indicated in general by the reference character 10, may be used with the conventional cold air syringe equipment of the type supplied with the dental units manufactured by the S. S. White Dental Manufacturing Company, Ritter Company, Inc. or The Weber Dental Manufacturing Company. The dental mirror attachment 10 comprises a supporting body 12 having a coupling fitting 13 extending from one end of the body 12 and terminating in an enlarged neck 14, and a bore 15 extending axially through the supporting body 12 and opening through the neck 14 and through the opposite end of the body 12. The supporting body 12 is also provided with a threaded bore 16 which is offset from the bore 15 and is inclined slightly relative to the axis of the bore 15 for receiving the threaded end 17 of a mirror supporting rod 18 having the dental mirror 19 fixed to the opposite end thereof and extending at an angle to the axis of the rod 18.

The supporting body 12 is also provided with a tubular extension 21 which is coaxially aligned with the bore 15 and projects in an opposite direction to the coupling fitting 13. The tubular extension 21 is provided with a split cone expanding chuck or collet chuck 22 at the end thereof which surrounds the posterior end of the bore 15. A short length of metal tube 23 is provided to couple the air delivered to the bore 15 through the air cut-off fitting into proximity with the surface of the mirror 19, one end 23' of the tube 23 being telescoped into the tubular extension 21 and the opposite end of the tube 23 being provided with a flaring nozzle 24 provided with an elongated transverse slit 25 therein forming the discharge nozzle for the compressed air delivered to the tube 23. A principal axis of the metal tube 23 is disposed at an angle of about 30 degrees to the principal plane of the dental mirror 19, and the discharge nozzle 24 is curved slightly so as to permit the slit 25 to be placed very close to the surface of the mirror 19 and to direct the air discharged through the slit 25 along the surface of the mirror 19 rather than angularly against the mirror so that the axis of propagation of the air discharged through the slit 25 is nearly parallel to the principal plane of the mirror 19. The chuck 22 permits the metal tube 23 to be adjusted within the tubular extension 21 so as to position the discharge nozzle 24 against the surface of the mirror 19 with the nozzle extending approximately 5 millimeters inwardly of the periphery of the mirror.

The enlarged neck 14 of the coupling fitting 13 projecting from the supporting body 12 is designed to be received within the clamping jaws of the conventional expanding chuck provided on the posterior end of the air cut-off fitting, the other end of the air cut-off fitting being coupled through the usual supply hose to a source of compressed air in the dental unit.

It must be remembered that the present device is designed for use with high speed dental equipment and consequently is expressly arranged to effect removal of running water on the mirror surface in such a manner as to render the dental field visible through the mirror, and is not designed to remove vaporized moisture to prevent fogging of the mirror surface. By having the discharge nozzle 24 located in contact or in substantial contact with the mirror surface with the discharge portion of the nozzle 24 curving into substantial parallelism with the plane of the mirror surface, and having an elongated transverse slit orifice at the discharge end of the nozzle 24 which fans the compressed air discharge over the surface of the mirror 19, the water flowing over the mirror surface is drawn by the compressed air to a very thin film so as not to impair vision as it is blown off of the mirror surface. Obviously, with water constantly running on the mirror, which is a necessary incident to the use of high speed drilling techniques with water coolant, the dental mirror 19 is never dry. However, my device places the water that is crossing the mirror in a thin layer so that it does not distort vision through the mirror. The mere provision of a blast of air directed onto the mirror is not effective for this purpose, as it causes bubbles and streams of water to appear on the mirror surface which distorts the image of the field viewed through the mirror to such an extent that visual examination of the field by the reflected mirror image is not sufficiently accurate for dental work. To be effective, the slit orifice 25 must be long and narrow, must be placed substantially in contact with the mirror surface and protrude well onto the surface of the mirror.

By arranging the dental mirror attachment 10 so that it can be conveniently coupled to the conventional air cut-off fitting of cold air syringe equipment, the air pressure may be conveniently maintained under precise control by the dentist at all times so that it can be regulated as needed so as not to make the operation uncomfortable to the patient. The attachment may be readily employed with the dental units already in use by most professional dentists. The mirror supporting rod 18 is readily removable from the supporting body 12 so as to facilitate interchange of mirrors by the dentist and thus reduce the frequency with which the whole unit needs to be sterilized. This effects a prolongation in the life of the equipment, as frequent sterilization is so rigorous on metals that only extremely high grade metals can withstand this procedure over an extensive period of time.

It may be found in many cases that dentists will not tolerate the bulky and heavy air hose and air cut-off fitting of the conventional cold air syringe equipment. It will be understood that dentists are accustomed to handling only a small, light handle mirror in the left hand and may not be willing to readjust themselves to the much heavier weight and bulk of the conventional cold air syringe equipment in the left hand.

To overcome this possible resistance to the use of the dental mirror unit, the valved handle unit illustrated particularly in FIGURES 4, 5 and 6 and designated generally by the reference character 30, has been designed. The handle unit 30 is designed to provide a simple, inexpensive and light handle containing an air valve regulating lever which may be conveniently regulated to control the air flow into the metal tube 23, and thus reduce the bulk and weight required to be carried by the dentist in his left hand.

The handle unit 30 comprises an elongated tubular body 31 having a bore therethrough which is of constricted cross-section as indicated at 32 over the anterior portion thereof and is of enlarged cross-section as indicated at 33 over the posterior portion thereof. The outermost end of the enlarged cross-section portion 33 of the bore is of a size complementary to the enlarged neck 14 of the coupling fitting 13 on the mirror attachment 10 and the bore section 33 is threaded as indicated at 34 immediately inwardly of the portion complementing the neck 14 to threadedly support a connecting fitting 35 having an enlarged central body portion 36, a tapered projection 37 adapted to tightly fit into the end of the bore 15 at the coupling fitting 13, and an oppositely projecting tubular stem portion 38. A leaf spring latching element 39 is also secured to the lateral surface of the tubular body 31 adjacent the end designed to receive the enlarged neck 14 and has a depending portion designed to engage a shoulder of the enlarged neck 14 and retain the neck within the tubular body 31. The connecting fitting 35 is provided with a bore 40 extending entirely therethrough opening at one end through the tubular stem 38 and at the other end through the tapered projection 37.

A small hose 41 of plastic or other suitable material, which may be a section of ⅛ inch outer diameter hose, runs through the bore portions 32, 33 of the tubular body 31 and is tightly fitted at one end over the tubular stem 38 of the connecting fitting 35 and is provided with a connector 42 which is designed to fit into the end of the conventional air syringe of dental units. The air syringe of the conventional dental unit will be left in the bracket stand and be adjusted to maximum flow of air at all times. It will be understood that, if desired, the air line within the dental unit can be tapped to permanently affix the hose 41 to it in lieu of connecting the air hose 41 to the conventional air syringe.

Control of the air flow through the hose 41 is effected by means of a valving arrangement comprising a lever 43 fulcrumed on a pivot pin 44 extending through ears 45 of a mounting ring 46 fixed on to the tubular body 31. A conventional torsion spring 47 surrounds the pivot pin 44 and bears upon the under surface of the lever 43 and the surface of the tubular body 31 to bias the lever 43 to the position shown in FIGURE 4. The working end of the lever 43, designated by the reference character 48, carries a depending projection 49 extending through a slot 50 in the wall of the tubular body 31 and pressing upon the hose 41 within the constricted bore portion 32. Due to the biasing action of the spring 47, it will be observed that the spring 47 urges the lever 43 in a counter-clockwise direction, thereby urging the foot 51 of the projection 49 downwardly to press the upper portion of the wall of the hose 41 downwardly against the lower wall portion of the hose 41 and of the bore portion 32 to close off air supply through the hose 41 to the bore 40 of the connecting fitting 35, and the bore 15 and tube 23 of the dental mirror unit 10.

It will be observed that an extremely simple, light and easily manipulated handle unit is provided for the dental mirror unit 10, which will free the dentist of the distracting heavy weight and bulk of conventional cold air dental syringes and which will facilitate free movement of the left hand while using the dental mirror unit. The valving arrangement provided by the lever 43 having the projection 49 extending into engagement with the hose 41 will be continuously, resiliently biased to a position closing off air supply to the nozzle 24 of the dental mirror unit and will be readily adjustable to provide the desired air flow through the nozzle 24 by pressure of the finger on the portion of the lever 43 remote from the end 48 to provide the desired quantity of air to draw the water on the mirror surface into a thin film which will not obstruct or distort vision.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

What is claimed is:

1. A dental mirror assembly adapted to be associated with a compressed air supply line for preserving a clear reflected image when water is flowing over the mirror surface incident to the use of high speed dental drills with water coolant, comprising a supporting body having a pair of extensions projecting in opposite directions therefrom, one of said extensions being adapted to be intercoupled with the compressed air supply line and the other of said extensions terminating in clamping means, said supporting body having a bore therein extending through said extensions and opening through the ends of said extensions remote from said supporting body, a dental mirror having an elongated rod projecting therefrom in inclined relation to the principal plane of said mirror and removably coupled to said supporting body for supporting said mirror at a fixed position projected from said supporting body, and a hollow tubular conduit rigidly supported at one end in said clamping means in communication with the bore in said other extension and terminating in compressed air discharge means including a nozzle having a flattened fan-shaped end portion disposed in substantial parallelism with the plane of the mirror and terminating in a narrow elongated exit orifice overlying and extending transversely of the surface of said mirror immediately adjacent said mirror surface, said fan-shaped end portion being directed to discharge compressed air from said compressed air supply line in a fan-shaped pattern over the surface of said mirror along axes lying in a plane substantially paralleling the principal plane of said mirror so that water on said mirror surface is drawn to a substantially uniform thin film to minimize distortion of the image of the dental field viewed through the mirror.

2. A dental mirror attachment for use with water cooled dental drills revolving in speeds exceeding 50,000 revolutions per minute, the attachment being adapted for assembly with a dental unit air cut-off valve of the elongated cylindrical type terminating in an expandible chuck remote from the compressed air supply line associated with the cut-off valve, comprising a flat circular dental mirror having a rod projecting from the periphery thereof in angular relation to the principal plane of the mirror, a supporting body having a valve coupling extension projecting from one end thereof adapted to be fitted into the expandible chuck of the air cut-off valve and supported thereby, and an oppositely projecting extension terminating in an expandible chuck, said supporting body having a threaded socket for receiving the end of said rod remote from said dental mirror rigidly supporting said mirror at a fixed position projected from said supporting body, an elongated hollow rigid tubular conduit fitted into said second-mentioned expandible chuck and clamped thereby to support the same from said supporting body, the end of said tubular conduit remote from said supporting body terminating in a discharge nozzle extending inwardly of the perimeter of said dental mirror and having a narrow elongated discharge slit lying in a plane substantially paralleling the plane of said mirror and disposed immediately adjacent the surface of the mirror, said discharge nozzle being oriented to direct compressed air from the compressed air supply line over the surface of the mirror along axes fanning over the mirror surface in a sector encompassing the major portion of the area of the mirror and lying in a plane substantially paralleling the principal plane of the mirror to force water flowing over the mirror surface into a substantially uniform thin film to minimize distortion of the image of the dental field viewed through the mirror.

3. A dental mirror assembly adapted to be associated with a compressed air supply line for minimizing distortion of the mirror image by water flowing over the mirror, comprising supporting means adapted to be coupled to the compressed air supply line having a bore therein extending therethrough having entrance and exit ends, the entrance end of said bore being adapted to be in communication with said supply line, a dental mirror having an elongated rod projecting therefrom coupled to said supporting means to support said mirror at a fixed position projected from said supply line, a hollow tubular conduit supported at one end by said supporting means in communication with the exit end of said supporting means bore, said hollow tubular conduit terminating remote from said supporting means in compressed air discharge means including a nozzle having a narrow elongated exit orifice extending transversely of the surface of said mirror disposed immediately adjacent the mirror surface to direct compressed air from the compressed air supply line over the surface of said mirror along axes fanning over the mirror surface in a plane substantially paralleling the plane of said mirror so that water on the mirror surface is drawn to a substantially uniform thin film which produces substantially no distortion of the mirror image, said supporting means including an elongated handle portion through which said bore extends, a resiliently deformable conduit adapted to communicate with and form an extension of said compressed air supply line extending through said bore within said handle portion, a valve member movably supported on said handle portion having a manually operable portion extending to an exposed position externally of said handle portion for manipulation by an operator and a working portion coacting with said resiliently deformable conduit for valving the flow of compressed air therethrough, in accordance with the position of said valve member, and means normally biasing said valve member to shut off the flow of compressed air through said resiliently deformable conduit.

4. A dental mirror assembly adapted to be associated with a compressed air supply line for minimizing distortion of the mirror image by water flowing over the mirror, comprising supporting means adapted to be coupled to the compressed air supply line having a bore therein extending therethrough having entrance and exit ends, the entrance end of said bore being adapted to be in communication with said supply line, a dental mirror having an elongated rod projecting therefrom coupled to said supporting means to support said mirror at a fixed position projected from said supply line, and a hollow tubular conduit supported at one end by said supporting means in communication with the exit end of said supporting means, bore, said hollow tubular conduit terminating remote from said supporting means in compressed air discharge means including a nozzle having a narrow elongated exit orifice extending transversely of the surface of said mirror disposed immediately adjacent the mirror surface to direct compressed air from the compressed air supply line over the surface of said mirror along axes fanning over the mirror surface in a plane substantially paralleling the plane of said mirror so that water on the mirror surface is drawn to a substantially uniform thin film which produces substantially no distortion of the mirror image, said supporting means including an elongated handle member through which said bore extends, a resiliently deformable flexible conduit extending through the bore in said handle member, and said handle member including valving means for controlling the compressed air admitted through said flexible conduit to said hollow tubular conduit comprising a lever pivotally supported on said handle member having a projection extending through the wall of said handle member into said bore to bear upon the wall of said flexible conduit and force the same against an opposite wall portion of the conduit and the surface of said bore to close the passage through said conduit, said lever having a manipulating end portion lying externally of said handle member for manipulation of said lever about its pivot to control the flow of air through said flexible conduit, and resilient means normally biasing said lever to a position closing the passage through said flexible conduit.

5. A dental mirror assembly adapted to be associated with a compressed air supply line for preserving a clear reflected image when water is flowing over the mirror surface incident to the use of high speed dental drills with water coolant, comprising a supporting body having a pair of extensions projecting in opposite directions therefrom, one of said extensions being adapted to be intercoupled with the compressed air supply line and the other of said extensions terminating in clamping means, said supporting body having a bore therein extending through said extensions and opening through the ends of said extensions remote from said supporting body, a dental mirror having an elongated rod projecting therefrom in inclined relation to the principal plane of said mirror and removably coupled to said supporting body for supporting said mirror at a fixed position projected from said supporting body, a hollow tubular conduit rigidly supported at one end in said clamping means in communication with the bore in said other extension and terminating in compressed air discharge means including a nozzle having a narrow elongated exit orifice extending transversely of the surface of said mirror immediately adjacent said mirror surface and directed to discharge compressed air from said compressed air supply line over the surface of said mirror along axes lying in a plane substantially paralleling the principal plane of said mirror so that water on said mirror surface is drawn to a substantially uniform thin film to minimize distortion of the image of the dental field viewed through the mirror, an elongated cylindrical handle assembled with said supporting body and extending oppositely therefrom in axial alignment with said hollow tubular conduit, said handle having a bore extending therethrough terminating at the end of said handle adjacent said supporting body in an enlarged bore portion complementing the end portion of said one of said extensions of said supporting body, releasable catch means for releasably holding a portion of said one of said extensions within said enlarged bore portion of said handle, a deformable flexible hose extending through said bore of said handle having one end thereof communicating with said hollow tubular conduit and the other end thereof adapted to communicate with said compressed air supply line, and valve means for controlling the compressed air admitted through said flexible hose to said hollow tubular conduit comprising a lever pivotally supported on said handle member having a projection extending through the wall of said handle member into said bore to bear upon the wall of said flexible hose and force the same against an opposite wall portion of the conduit and the surface of said bore to close the passage through said hose, said lever having a manipulating end portion lying exteriorly of said handle member for manipulation of said lever about its pivot to control the flow of air through said flexible hose, and resilient means normally biasing said lever to a position closing the passage through said flexible hose.

References Cited in the file of this patent
UNITED STATES PATENTS

| | | |
|---|---|---|
| 2,711,586 | Groves | June 28, 1955 |
| 2,809,430 | Barber | Oct. 15, 1957 |